United States Patent [19]

Nagamune et al.

[11] Patent Number: 5,115,242
[45] Date of Patent: May 19, 1992

[54] IN-FURNACE SLAG LEVEL MEASURING APPARATUS

[75] Inventors: Akio Nagamune; Kouichi Tezuka; Isamu Komine, all of Tokyo, Japan

[73] Assignee: NKK Corporation, Tokyo, Japan

[21] Appl. No.: 676,081

[22] Filed: Mar. 27, 1991

[30] Foreign Application Priority Data

Mar. 30, 1990 [JP] Japan .................................. 2-81312
Mar. 30, 1990 [JP] Japan .................................. 2-81313

[51] Int. Cl.⁵ .......................................... G01S 13/28
[52] U.S. Cl. .................................. 342/124; 342/130; 342/145; 342/205
[58] Field of Search ............... 342/124, 129, 130, 131, 342/134, 145, 205; 367/100

[56] References Cited

U.S. PATENT DOCUMENTS

| 3,614,785 | 10/1971 | Kratzer | 342/145 X |
| 4,044,356 | 8/1977 | Fournier | 342/145 X |
| 4,241,347 | 12/1980 | Albanese et al. | 342/131 X |
| 4,442,513 | 4/1984 | Mead | 367/100 |
| 4,758,839 | 7/1988 | Goebel et al. | 342/132 |
| 4,933,916 | 6/1990 | May et al. | 367/125 |

Primary Examiner—Gilberto Barrón, Jr.
Attorney, Agent, or Firm—Michael N. Meller

[57] ABSTRACT

Disclosed is an in-furnace slag level measuring apparatus having a microwave radar for measuring a slag level in a convertor or the like. The level of a transmission signal or a reception signal is adjusted in accordance with the level of a detection signal so that the signal level in the microwave radar is adjusted to be constant. Further, the level measurement value and the detection signal are inputted and the level measurement values obtained in a predetermined time are subjected to averaging operation. In the averaging operation, when the detection signal is smaller than a set point, the averaging operation is performed while disregarding the level measurement value at that time.

9 Claims, 10 Drawing Sheets

PSEUDO RANDOM SIGNAL GENERATER

| ADDRESS | DATA IN MEMORY |
|---|---|
| 0 | 1 1 |
| 1 | 1 1 |
| 2 | 1 1 |
| 3 | 1 0 |
| 4 | 1 0 |
| 5 | 1 1 |
| 6 | 1 0 |
| 7 | 0 0 |
| 8 | 0 0 |
| ... | ... |
| 127 | 0 0 |

| INPUT DATA | OUTPUT SIGNAL |
|---|---|
| 1 1 | + |
| 1 0 | − |
| 0 1 | 0 |
| 0 0 | 0 |

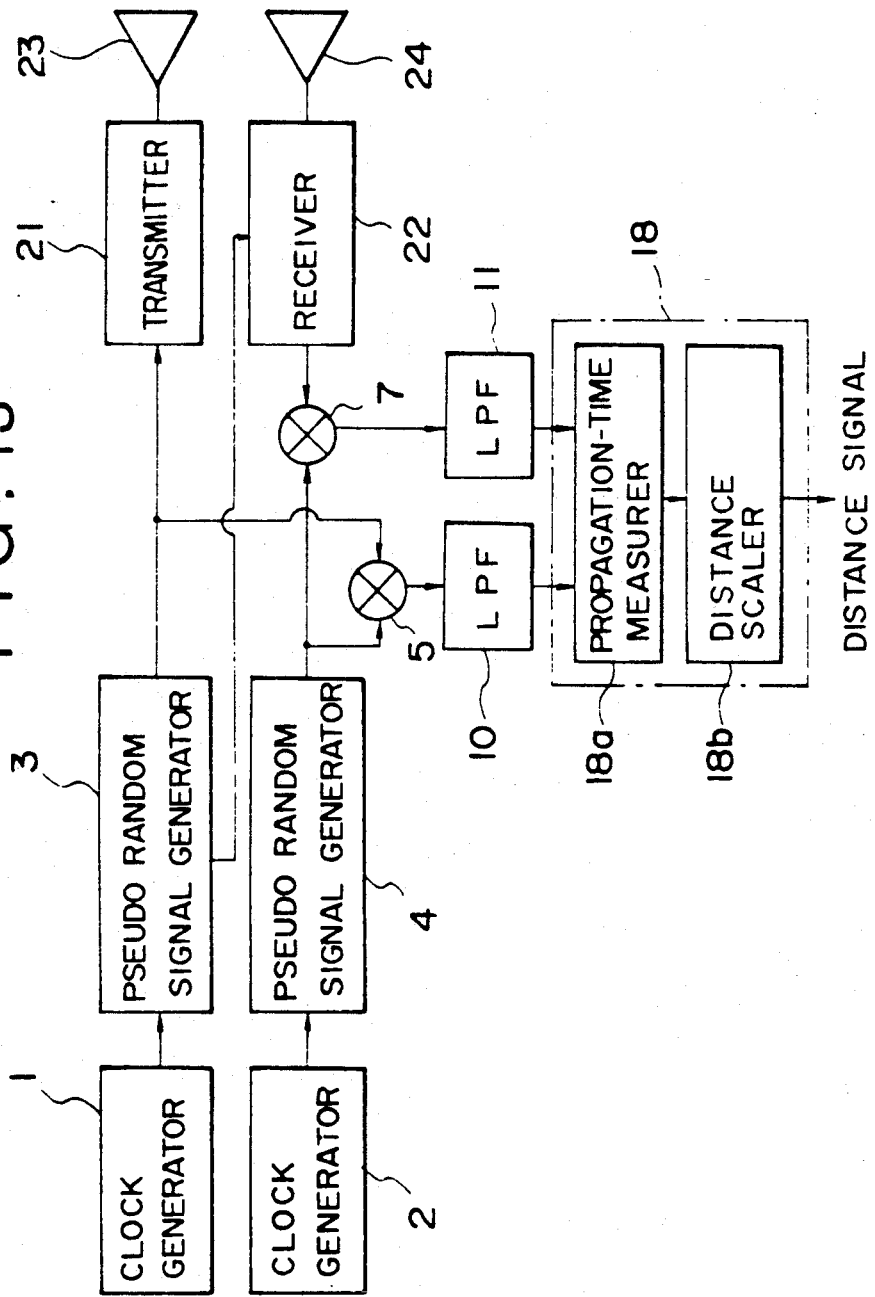

IN-FURNACE SLAG LEVEL MEASURING APPARATUS

BACKGROUND OF THE INVENTION

The present invention relates to an in-furnace slag level measuring apparatus for measuring the level of in-furnace slag, melt, raw material, etc. in a convertor or the like by utilizing a microwave.

In a conventional in-furnace slag level measuring apparatus, for example, a microwave radar is provided at a furnace top of a convertor so that electromagnetic wave transmitted by the microwave radar through a waveguide and a transmission antenna is reflected on a slag surface. The electromagnetic wave thus reflected is received through a reception antenna and a waveguide and then subjected to signal processing to measure the distance between the microwave radar and the in-furnace slag surface.

As the microwave radar for use for such measurement, there are various kinds of measurement systems as follows.

One of those systems is, for example, an FM-CW microwave radar system. As disclosed, for example, in Japanese Patent Unexamined Publication No. Sho-63-21584, this measurement system comprises the steps of: transmitting a microwave formed by frequency-modulating a continuous microwave of about 10 GHz, from an antenna toward a level surface; and counting a beat frequency produced by mixing the transmission signal with the wave reflected on the level surface to thereby measure the distance between the microwave radar and the slag surface. That is, the distance measurement in this measuring system is based on the fact that the propagation time of the microwave required for reciprocating the distance between the antenna and the slag surface corresponds to the aforementioned beat frequency.

As the system of this type, there is a pulse-modulated microwave radar system. This measurement system comprises steps of: pulse-modulating a microwave having a frequency of about 10 GHz to about 20 GHz and transmitting the pulse-modulated microwave as in an ordinary airplane; radar and measuring the distance between the radar and the slag surface on the basis of the fact that the propagation time of the microwave required for receiving the microwave reflected on the slag surface is in proportion to the distance between the radar and the level surface.

In the conventional in-furnace slag level measuring apparatus using such a microwave radar, the transmission antenna and the reception antenna are fixed to specific positions at the furnace top portion of the convertor or in the furnace. Accordingly, there arise the following problems as to the change of the slag level in the furnace.

In the case where the transmission and reception antennas are fixed at the furnace top portion, the slag level position cannot be often measured accurately because of the influence of unnecessary signals reflected from the in-furnace lance, the furance opening portion and the furnace wall portion when the distance between the transmission and reception antennas and the slag level increases as the slag level in the furnace decreases. In order to solve the above-mentioned problems, on the other hand, the inventors of this application have proposed, Japanese Patent Unexamined Publication No. Hei-2-98685, a distance measuring method of the microwave M-type radar system utilizing an M-type signal which is a kind of a pseudo random signal. In this measuring method, a time difference between a time-series pattern obtained by detecting a carrier which is phase-modulated with a first pseudo random signal, transmitted toward a target and then reflected from the target, and another time-series pattern of a product obtained by directly multiplying the first pseudo signal by a second pseudo random signal is detected to thereby measure the distance between the measuring apparatus and the slag surface which is the target.

In the in-furnace slag level measuring apparatus using the above-mentioned random signal processing, the distance between the antenna and the in-furnace slag level surface is obtained form the time interval between the respective peaks of a detection signal and a time reference signal with a preferable result. In the apparatus, however, there are problems as follows.

In a convertor or the like, the change of slag in the furnace is so large that the change of the distance between the antenna and the slag surface and the change of the shape of the slag surface are also large, and in addition, the signal strength of the reception microwave signal reflected from the slag surface is also largely changed by the scattering of slag or the like. In the case where the reflected signal strength becomes large, accordingly, signal saturation occurs in an amplifier in a radar apparatus to cause distortion in a detection signal waveform obtained as a result of signal processing to make it difficult to correctly detect the peak of the detection signal pulse to thereby produce a measurement error. In the case where the reflected signal strength becomes small, on the contrary, the detection signal output also becomes small to lower the signal to noise ratio S/N so that an erroneous signal peak is sometimes detected to thereby produce a measurement error.

SUMMARY OF THE INVENTION

It is therefore an object of the present invention to provide an in-furnace slag level measuring apparatus in which the in-furnace slag level can be correctly measured even in the case where the change of the in-furance slag level is violent.

It is another object of the present invention to provide an in-furance slag level measuring apparatus in which the in-furnace slag level can be measured with high accuracy by using pseudo random signals such as even in the case where the change of the in-furnace slag level is violent.

According to an aspect of the present invention, the in-furnace slag level measuring apparatus has a microwave radar which measures and outputs a slag level by using a transmission and a reception antenna inserted into a furnace.

In the slag level measuring operation, the microwave radar measures the distance to a target through the steps of: transmitting a carrier phase-modulated with a first pseudo radom signal toward a target through a transmission antenna; obtaining a time-series pattern of a detection signal by detecting a carrier obtained by multiplying a reception signal reflected on the target and received through a reception antenna by a second pseudo random signal; obtaining another time-series pattern of a multiplication value obtained by directly multiplying the first and second pseudo random signals by each other; and measuring the time difference between the time-series pattern of the direction signal and the time-series pattern of the multipication value. Accordingly, the following effects can be attained.

(1) Because of non-contact measurement, durability of sensor portions such as an antenna, etc. can be secured and, at the same time, both the device attachment and maintenance can be simplified.

(2) Because of continuous measurement, a measurement of high response can be made.

(3) Because spectrum-diffused signals using pseudo random signals are used, both the noise reduction and signal emphasis can be attained by application of a correlation processing using a reference pseudo random signal in the reception portion. Accordingly, the wave reflected on a target having a low reflectivity can be detected sensitively, so that the measurement can be used for wide purposes.

(4) Because the high-speed signal conventionally used for a measurement can be converted into a low-speed signal by a circuit relatively simple in construction according to the present invention, a low-cost and small-size apparatus can be provided. Further, the adjacent is made easy.

As means for detecting a carrier reflected on the target and subjected to a correlation processing after reception to obtain a detection signal, an in-phase component and a quadrature component as to the phase of the transmission carrier are extracted from the carrier after the correlation processing. The components are respectively squared through low-pass filters and then added to each other to obatain a detection signal. Accordingly, the target can be detected with very high sensitivity.

Further, a carrier phase-modulated with a first pseudo random signal is transmitted to the target, and the reception signal reflected from the target is subjected to a correlation processing by a second psuedo random signal having the same pattern as the first pseudo random signal and having a frequency near the frequency of the first pseudo random signal. By performing the measurement by using the carrier obtained through the above-mentioned processing, as will be described later, the measurement time between the detection signal obtained from the target and a reference signal is very greatly enlarged on a time axis so that the distance to the target can be measured accurately even when the distance is short. Further, the necessary signal reflected on the target as a subject of the measurement can be clearly discriminated/separated from unnecessary signals reflected on other matters than the target, on the time axis in which the detection signal is generated. Accordingly, the slag level in the furnace can be measured stably even under the measurement environment of narrow space such as the inside of the furnace in which unnecessary reflected signals will be generated easily, because the unnecessary reflected signals can be removed.

That is, according to another aspect of the present invention, in the microwave radar, a first pseudo random signal generation means and a second pseudo random signal generation means respectively generate a first pseudo random signal and a second pseudo random signal having the same pattern as that of the first pseudo random signal and having a frequency slightly different from the frequency of the first pseudo random signal. A spectrum-diffused signal formed by phase-modulating a carrier with the first pseudo random signal is transmitted toward a target by a transmission means. Then, a reception signal obtained by receiving the wave reflected on the target by a reception means is multiplied by the second pseudo random signal through a second multiplier. When the modulated phase of the reception signal phase-modulated with the first pseudo random signal coincides with the phase of the second pseudo random signal, the result of multiplication obtained as an output from the second multiplier becomes an in-phase carrier and is subject to synchronous detection by a coherent detector means in the succeeding stage. The detection output is further signal processed through a detection signal generation means constituted by a pair of low-pass filters, a pair of squarers and an adder to thereby output a pulse-like target detection signal.

However, the first and second pseudo random signals are equal to each other in the code pattern thereof but slightly different from each other in the frequency of the signal generator means. Accordingly, the phases of the two signals become shifted from each other with the passage of time after the phase of the two signals coincide with each other (that is, the correlation output of the two signals takes its maximum value). When the phases of the signals are shifted from each other by one code length or more, the correlation of the two pseudo random signals is lost. In this condition, the phase of the carrier obtained as a result of multiplication of the reception signal by the second pseudo random signal becomes random, so that the frequency band is restricted by the low-pass filters after synchronous detection by the coherent detector means in the succeeding stage and it is impossible to obtain a target detection signal.

When the phase difference between the first and second pseudo random signals becomes just equivalent to one period of one pseudo random signal after time is further passed, the phases of the two signals become coincident with each other again. In this condition, the correlation output of the two signals takes its maximum value again so that a pulse-like target detection signal is obtained again through the coherent detector means and the detection signal generator means. Thus, this phenomenon is repeated at regular time intervals so that a cyclic pulse-like signal can be obtained as a target detection signal.

On the other hand, the setting of reference time is necessary for measuring the point of time when the target detection signal is obtained from the reception signal. Therefore, a time reference signal for representing the reference time is generated as follows. The first pseudo random signal is directly multiplied by the second pseudo random signal through the first multiplier. Then, a time series pattern as a result of the multiplication is picked up through a low-pass filter, so that a pulse-like signal having the same period as that of the target detection signal is obtained as the time reference signal.

Accordingly, because the time from the point of time when the time reference signal is generated to the point of time when the target detection signal obtained from the reception signal is generated is proportional to the propagation time taken for the electromagnetic wave to move forth and back between the transmission/reception antenna and the target, the distance between the transmission reception antenna and the target can be calculated from the time difference between the two signal.

The aforementioned explanation can be formulated as follows:

Let f1 be the repetition frequency of the first pseudo random signal. Let f2 be the repetition frequency of the second pseudo random signal. It is now assumed that the patterns of the pseudo random signals are equal to each other and that f1 is larger than f2.

When the period in which the reference signal obtained on the basis of correlation of the first and second pseudo random signals transmitted takes its maximum is replaced by TB, the different in the number of waves between the first and second pseudo random signals contained in the period TB is equal to the number N of one-period waves. That is, the following equation is obtained.

$$TB \cdot f1 - TB \cdot f2 = N$$

Rearranging the equation, TB is represented by the following equation (1).

$$TB = N/(f1 - f2) \quad (1)$$

That is, the period TB in which the reference signal takes its maximum increases as the difference between the two clock frequencies decreases.

Let $\tau$ be the propagation time from the point of time when the carrier phase-modulated with the first pseudo random signal is transmitted to the point of time when the carrier is received after reflected on the target. Let TD be the time difference between the point of time when the pulse-like signal of the target detection signal obtained by demodulating the reception signal on the basis of the second pseudo random signal and coherently detecting it is generated and the point of time when the pulse-like signal of the reference signal is generated. Because the number of waves of the second pseudo random signal generated in the period TD is smaller, by the number of waves of the first pseudo random signal generated in the propagation time $\tau$, than the number of waves of the first pseudo random signal generated in the period TD, the following equation is established.

$$TD \cdot f2 = TD \cdot f1 - \tau \cdot f1$$

Rearranging the equation, TD is represented by the following equation (2).

$$TD = \tau \cdot f1/(f1 - f2) \quad (2)$$

That is, the period TD is measured as a value obtained by elongating the propagation time $\tau$ by f1(f1−f2) times or in other words reducing the measurement speed by f1(f1−f2) times. It may be said that a distance measuring system or apparatus essentially suitable for short-distance measurement can be provided according to the present invention by enlarging the measurement time.

Here, the propagation time $\tau$ is expressed by the equation:

$$\tau = 2x/v$$

in which v represents the propagation speed, and x represents the distance to the target.

Accordingly, the following equation (3) is obtained on the basis of the equation (2).

$$x = \frac{f1 - f2}{2f1} \cdot v \cdot TD \quad (3)$$

In short, the distance x can be measured by measuring the time difference TD according to the equation (3).

According to a further aspect of the present invention, the microwave radar uses a technique of suppressing the change of detection signal strength through adjustment of signal strength in the receiver/transmitter to thereby suppress generation of errors caused by signal saturation and reduction of the signal level. Accordingly, the slag level position in the furnace can be measured accurately even when the strength of the microwave signal reflected on the slag level changes by the change of the slag level in the furnace or the like.

Further, according to a still further aspect of the present invention, the microwave radar performs averaging processing to average the measurement values while neglecting low S/N measurement values. Accordingly, the slag level position in the furnace can be measured accurately even when the signal level is temporarily reduced by the sudden change of the slag level.

According to another aspect of the present invention, since a peeudo random signal generator is constituted by a counter, a storage device, and a signal convertor, any an M-type signal and other pseudo random signal other than an M-type signal, such as a Barker code, or the like, can be used. When, for example, a Barker code is used a pseudo random signal, the signal reflected on the target can be detected sensitively by a technique of generating a signal intermittently through providing a time interval for each period of the output the Barker code while changing the signal sensitivity of the radar with the passage of time to mask unnecessary reflected signals temporarily.

The counter is supplied with a clock signal from a clock signal generator, counts the clock signal, and supplied count value to the storage device. When the counting reaches an upper limit value of the counter, the counter is reset to zero and continues the counting again. The reset signal at this time is supplied to the reception means. The storage device designates the data in the memory area of the storage device by using, as an address thereof, the count value supplied from the counter and reads out the designated data. In the memory area of the storage device, code data for forming desired pseudo random signals such as Baker codes or the like are stored in advance. The signal convertor converts the data read out from the storage device into a three-valued signal. In the case where the data read out from the storage device are code data of a pseudo random signal, the signal convertor outputs a positive (+) signal or a negative (−) signal in accordance with the code data value, while in the case where the data read out from the storage device are not code data, the signal convertor outputs a zero signal. Thus, the pseudo random signal generator repeatedly outputs a pseudo random signal stored in the storage device in synchronism with the clock signal supplied thereto.

According to a further aspect of the present invention, the reception means is supplied with a reflection signal reflected from a target and received by the reception antenna, and amplifies or attenuates the supplied signal the signal amplification/attenuation factor in the reception means changes temporally in synchronism with the period of the pseudo random signal generated by the pseudo random signal generator.

The above and other objects as well as advantageous features of the present invention will become clearer from the following description taken in conjunction with the drawings.

BRIEF DESCRIPTION OF THE DRAWINGS

FIG. 13 is a block diagram showing the configuration of another embodiment of the microwave radar according to the present invention.

DESCRIPTION OF THE PREFERRED EMBODIMENT

Figure 1:
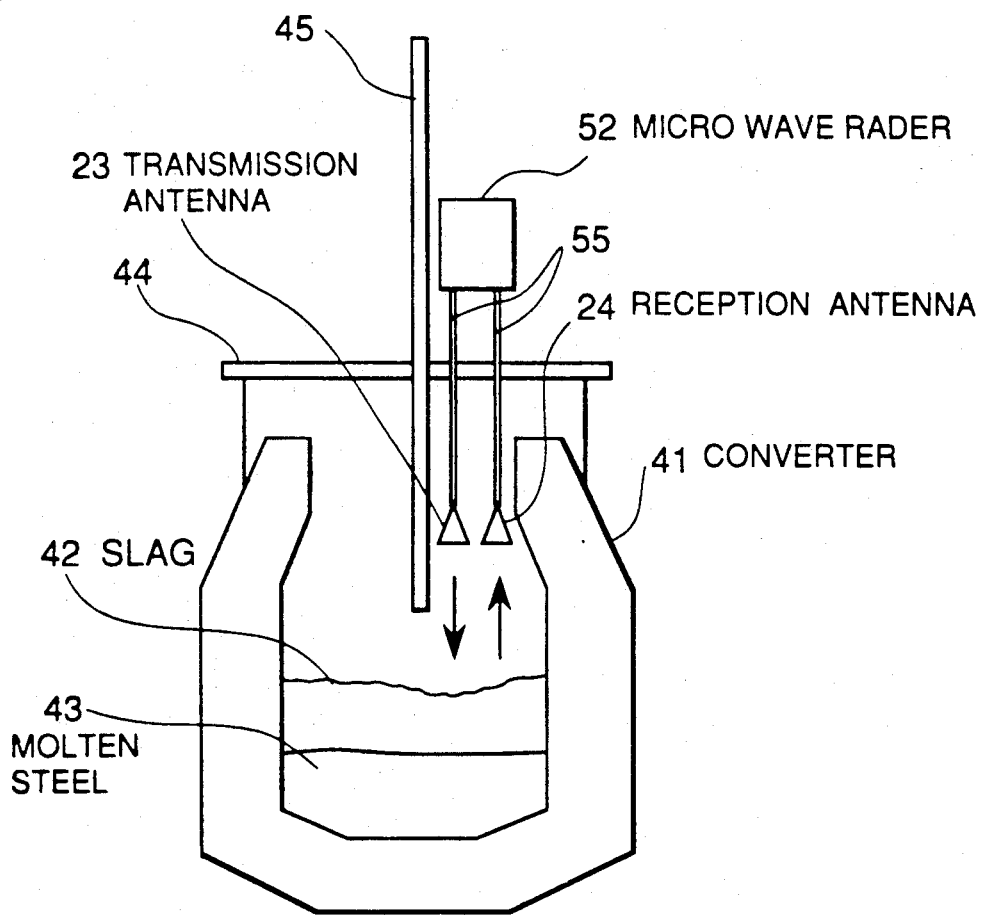
FIG. 1 is a view showing an embodiment of the in-furnace slag level measuring apparatus according to the present invention.

In an embodiment the in-furnace slag level measuring apparatus illustrated in FIG. 1, the reference numeral 41 designates a convertor, 42 designates slag in the covertor 41, and 43 designate molten steel. The reference numerals 44 and 45 designate a hood and a lance respectively.

The reference an numeral 52 designates a high-sensitive microwave radar using M-type signal processing, the detailed configuration of which will be described later in detail. The reference numeral 55 designates a wave guide connecting the microwave radar 52 with transmission and reception antennas 23 and 24.

Now the microwave radar 52 used the in-furnace slag level measuring apparatus will be described below.

Figure 2:
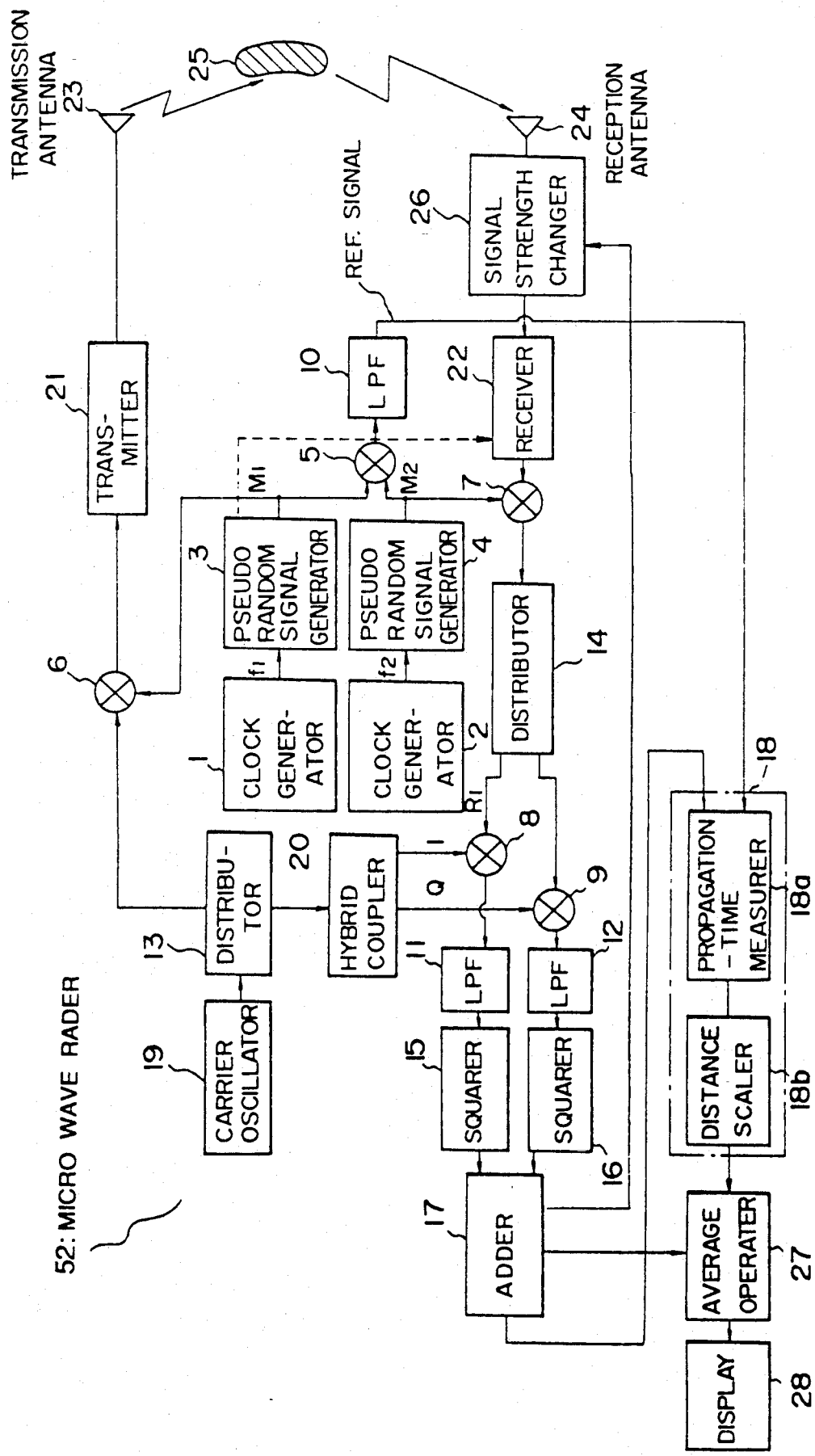
FIG. 2 is a block diagram showing the configuration of an embodiment of the microwave radar to be applied to the in-furnace slag level measuring apparatus of FIG. 1.

In the embodiment of the microwave radar shown in FIG. 2, the references numerals 1 and 2 designate clock generators respectively, and 3 and 4 designate pseudo random signal generators respectively. The reference numerals 5 through 9 designate multipliers, for example, constituted by double-balanced mixers respectively. The reference numerals 10 through 12 designate low-pass filters respectively, 13 and 14 designate distributors respectively, 15 and 16 designate squares respectively, 17 designates an adder, 18 designate a time measurer, 18 designates a carrier oscillator, 20 designates a hybrid coupler, 21 designates a transmitter, 22 designates a receiver, 23 designates a transmission antenna, 24 designates a reception antenna and 25 designates a target. The reference numeral 26 designates a signal strength changer, 27 an average operator, and 28 designates a display unit.

Referring to the timing chart of FIG. 3, the operation of the apparatus of FIG. 2 will be described. For example, each of the pseudo random signal generators 3 and 4 may be constituted by an Mp-type signal generator. The M-type signal generator may be a 7-bit M-type signal generator constituted by a shift register 30 of a 7-stage structure and an exclusive OR circuit 31, as shown in FIG. 4, the shift register 30 being a 7-stage structure composed, for example, of ECL (emitter-coupled logic) elements. The M-type signal is a periodically circulating signal having a combination of codes "1" (corresponding to a positive voltage $+E$) and "0" (corresponding to a negative voltage $-E$). In this example of 7 bits, one period is completed when $127(=2^7-1)$ signals (also called 127 signal-chips) are generated. Accordingly, in this example, a circulating signal repeating this period is generated.

Each of the pseudo random signal generators 3 and 4 is constituted by one and the same circuit, so that the output signals of the pseudo random signal generators 3 and 4 have the same pattern. However, the pseudo random signal generators 3 and 4 are slightly different in clock frequency supplied thereto, so that they are slightly different in one period thereof. Ohter than the Mp-type signal, a Gold-type signal or a Jpl-type signal may be used as a pseudo random signal.

Each of the clock generators 1 and 2 includes a quartz oscillator by which a clock signal sufficiently stable in frequency is generated however, the clock generator 1 and 2 are slightly different in the frequency generated. In this embodiment, the frequencies f1 and f2 generated by the clock generators 1 and 2 are 100.004 MHz and 99.996 MHz, respectively, so that the difference f1−f2 between the frequencies is 8 KHz. The clock signals f1 and f2 respectively generated from the clock generators 1 and 2 are respectively supplied to the pseudo random signal generators 3 and 4. The pseudo random signal generators 3 and 4 generate M-type signals M1 and M2 slightly diffferent in one period thereof but of the same pattern, on the basis of the difference in frequency between the driving clock signals. Here, the respective frequencies of the two M-type signals M1 and M2 can be calculated as follows.

(Frequency of M1) = 127 × 1/100.004
MHz ≃ 1269.9492 ns (Frequency of M2) = 127 × 1/99.996
MHz ≃ 1270.0508 ns Accordingly, the two Mp-type signals M1 and M2 have the substantially the same period of about 1270 ns ($10^{-9}$ sec.) but have a time difference of about 0.1 ns. Therefore, if the two M-type signals M1 and M2 are circulatedly generated and the patterns of the two Mp-type signals are matched with each other at a certain point of time ta, a time difference of 0.1 ns arises between the two signals whenever one period is passed, or in other words, a time difference of 10 ns arises between the two signals when 100 periods are passed.

Because the M-type signal has 127 signal-chips generated in a period of 1270 ns, the time required for generating one signal-chip is 10 ns. Accordingly, the fact that a time difference of 10 ns arises between the two M-type signals M1 and M2 represents the fact that the M-type signals are diverged by one signal-chip from each other. The output M1 of the pseudo random signal generator 3 is supplied to the multipliers 5 and 6. The output M2 of the pseudo random signal generator 4 is supplied to the multipliers 5 and 7.

For example, the carrier generator 19 generates a microwave having a frequency of about 10 GHz. The output signal of the carrier generator 19 is distributed, by the distributor 13, into the multiplier 6 and the hybrid coupler 20. For example, the multiplier 6 is constituted by a double-balanced mixer. The multiplier 6 multiplies the carrier of about 10 GHz fed from the distributor 13 by the M-type signal M1 fed from the pseudo random signal generator 3 and feeds the transmitter 21 with a spectrum diffused signal formed by phase-modulating the carrier.

The transmitter 21 power-amplifies the input spectrum-diffused signal, converts it into an electromagnetic wave through the transmission antenna and radiates it toward the target 25. Because the wavelength of the electromagnetic wave having a frequency of 10 GHz is 3 cm in air and is sufficiently larger than the size (diameter) of dust in an iron-manufacturing furnace, there is litle influence of dust or the like. For example, each of the transmission antenna 23 and the reception antenna 24 is constituted by a horn antenna to narrow down the directivity sharply to thereby reduce electric power reflected on matters other than the target, as sufficiently as possible. For example, each of the transmission antenna 23 and the reception antenna 24 has an antenna gain of about 20 dB.

The electromagnetic wave radiated from the transmission antenna 23 toward the target 25 is reflectd on the target 25, converted into an electric signal through the reception antenna 24 and fed to the receiver 22 through the signal strength changer 26. The configuration and operation of this signal strength changer 26 will be described later. Of course, the point of time when the input signal is supplied to the receiver 22 is delayed from the point of time when the electromagnetic wave is radiated from the transmission antenna 23 by the propagation time of the electromagnetic wave which is taken for the electromagnetic propagates forward from the transmission antenna 23 to the target 25 and then propagates back from the target 25 to the reception antenna 24. The receiver 22 amplifes the input signal and feeds the amplified signal to the mutiplier 7.

On the other hand, the M-type signals M1 and M2 respectively fed from the pseudo random signal generators 3 and 4 to the multiplier 5 are multiplied by each other. The time series signal representing the multiplication value is supplied to the low-pass filter 10. The inputs signal to the low-pass filter 10, that is, the time series signal representing the output value of the multiplier 5, has a waveform as shown in the diagram (a) of FIG. 3. In the time region a1 in which the phases of the two pseudo random signals fed to the multiplier 5 are matched with each other, an output voltage +E is continued. In the time region a2 in which the phases of the two signals are not matched with each other, an output voltage +E and an output voltage −E are produced at random.

The low-pass filters 10 through 12 have a kind of integral function based on the band limitation for frequency. Accordingly, when the phases of the two signals are matched with each other, the output signal from the low-pass filters 10 through 12 as a signal formed by integrating correlative operation values of the two signals is a pulse-like signal as shown in the diagram (b) of FIG. 3. When the phases of the two signals are not matched with each other, the output signal from the low-pass filters has a value of 0. Therefore, a periodic pulse-like signal is produced in the output of the low-pass filter 10. The pulse-like signal as a reference signal for time is supplied to the time measurer 18. In this embodiment, the period TB of the reference signal calculated on the basis of the aforementioned equation (1) is 15.875 ms, because f1 and f2 are 100.004 MHz and 99.996 MHz, respectively. The reference signal and the period TB thereof are shown in the diagram (d) of FIG. 3.

The reception signal from receiver 22 and the M-type signal M2 from the pseudo random signal generator 4 are fed to the multiplier 7 and multiplied by each other. When the modulated phase of the reception signal formed by phase-modulating the transmission carrier on the basis of the first M-type signal M1 is matched with the phase of the second M-type signal M2, the multiplication result from the multiplier 7 as a matched-phase carrier signal is supplied to the distributor 14. When the modulated phase of the reception signal is not matched with the phase of the M-type signal M2, the mutiplication result from the multiplier 7 as a random-phase carrier signal is supplied to the distributor 14. The distributor 14 distributes the input signal into the two multipliers 8 and 9, that is, the two output signals R1 and R2 from the distributor 14 are supplied to the multipliers 8 and 9, respectively.

The hybrid coupler 20 supplied with a part of the transmission carrier from the distributor 13 supplies the multipliers 8 and 9 with an in-phase (zero-phase) component signal I having the same phase as the phase of the input signal and a quadrature (90°—phase) component signal Q having a phase perpendicular to the phase of the input signal, respectively. The multiplier 8 multiplies the signal I (that is, the signal having the same phase as that of the output from the carrier oscillator 19 ) fed from the hybrid coupler 20 and the aforementioned signal R1 fed from the distributor 14 by each other. Similarly to this, the multiplier 9 multiplies the input signal Q (that is, signal having a phase shifted by 90 degrees from the output of the carrier oscillator 19) and the aforementioned signal R2 by each other. Accordingly, the multipliers 8 and 9 respectively extract a zero-phase component (I.R1) and a 90°—phase component (Q.R2) from the reception signal and send out the two components as detected signals.

The signals I.R1 and Q.R2 as detected signals are supplied to the low-pass filters 11 and 12, respectively.

The low-pass filters 11 and 12 have an integral function based on band on band limatation of frequency. By the integral fuction, the low-pass filters 11 and 12 integrate correlative operation values of the two signals. That is, when the phase of the aforementioned signal R1 fed from the multiplier 7 to the multiplier 8 through the distributor 14 is matched with the phase of the aforementioned signal I fed from the hybrid coupler 20 to the multiplier 8 and when the aforementioned signal R2 fed to the multiplier 9 is matched with the signal Q fed to the multiplier 9, the output signals from the multipliers 8 and 9 become pulse signals of predetermined polarity (the voltage +E or the voltage −E) so that large voltages arise in the outputs of the low-pass filters 11 and 12 integrating the signals, respectively.

When the phase of the aforementioned signal R1 is not matched with the phase of the signal I and when the aforementioned signal R2 is not matched with the phase of the signal Q, the output signals from the multipliers 8 and 9 become pulse signals of randomly changed polarity (that is, the voltage $-E$ and the voltage $-E$) so that zero voltage arises in the outputs of the low-pass filters 11 and 12 integrating the signals, respectively.

The zero-phase and 90°—phase components thus subjected to the integral processing through the low-pass filters 11 and 12 are supplied to the squares 15 and 16, respectively. The square 15 and 16 respectively square the amplitudes of the input signals and feed the output signals as operation results to the adder 17. The adder 17 addes the two input signals to each other supplies a pulse-like detection signal as shown in the diagram (c) of FIG. 3 to the time measurer 18.

It is now assumed that the point of time when the detection signal takes its maximum is tb. The aforementioned technique having the steps of detecting zero-phase and 90°—phase components of transmission carrier respectively from a signal formed by the correlation processing of the reception signal and the M-type signal M2, integrating the detection signals and then squaring the integrated signals respectively, and adding the pair of squared values to each other to obtain a target detection signal, is more or less complex in configuration but can obtain a high-sensitive target detection signal. As the correlative output of the pseudo random signal such as an M-type signal can be obtained, a high SN measuring system to reduce the influence of noise for the purpose of signal emphasis can be provided. Of course, a detection technique using crystal may be employed according to the specification and cost because the technique is inferior in sensitivity but simple in configuration.

The time measurer 18 is composed of a propagation-time measurer 18a and a distance scaler 18b. The propagation-time measurer 18a measures the time TD between the point of time ta when the reference signal fed from the low-pass filter 10 takes its maximum and the point of time when the detection signal fed from the adder 17 takes its maximum. Therefore, the propagation-time measurer 18a has a function for detecting the time points when the two input signals respectively take the maximum values. For example, the time point when an input signal takes its maximum value can be detected by detecting the time point of turning-over of the input signal (from increase to decrease for time) while temporarily comparing the present sample value and the previous sample value successively obtained by sample-holding of the input voltage value on the basis of the clock signal. The time TD represents a time between the time point ta of generation of the maximum value of the reference signal as shown in the diagram (d) of FIG. 3 and the time point tb of generation of the maximum value of the detection signal as shown in the diagram (c) of FIG. 3. As shown in the aforementioned equation (2), the time TD can be calculated by increasing the propagation time $\tau$ required for the electromagnetic wave actually moving forth and back as to the distance between the transmission and reception antennas 23 and 24 and the target 25 by f1(f1−f2) times. In this embodiment, the following equation (4) is obtained by increasing the time by 12,500 times, because f1 = 100.004 MHz and f2 = 99.996 MHz.

$$TD = 12,500\tau \quad (4)$$

The time TD as expressed by the equation (4) is obtained for each period TB of the reference signal.

Because the measurement time in the present invention is enlarged very greatly, the distance to the target can be measured with high accuracy. Accordingly, it may be said that the measurement apparatus according to the present invention is suitable to a level meter for measuring short distance such as in-furnace slag level, melt level, etc.

Accordingly, the distance x (meter) from the transmission and reception antennas 23 and 24 to the target 25 is represented by the following equation (5) when it is calculated according to the equation (4).

$$x = (f1-f2)/2f1 \cdot v \cdot TD = 1.2 \times 10^4 \cdot TD \quad (5)$$

The operation expressed by the equation (5) is carried out by the distance scaler 18b to generate a distance signal.

Next, the configuration and operation of the signal strength changer 26 will be described.

Figure 5:
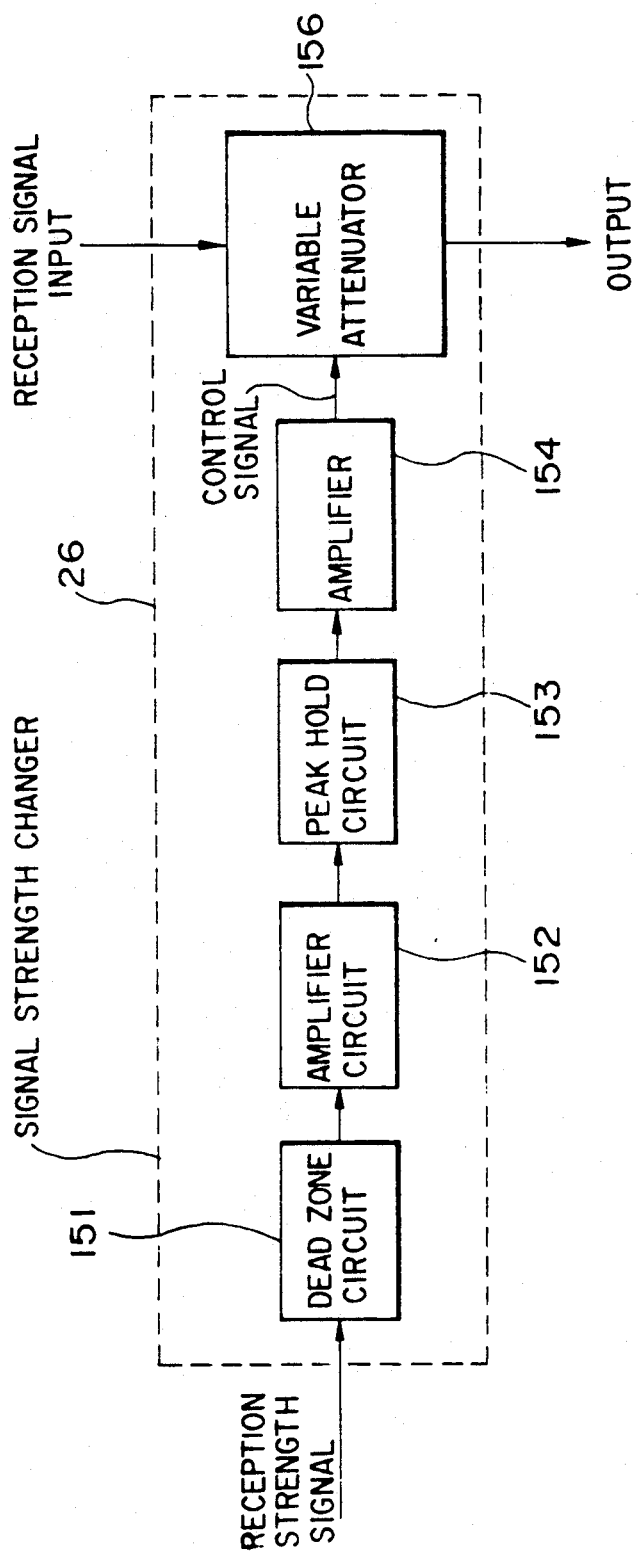
FIG. 5 is a block diagram showing an embodiment of the signal strength changer of FIG. 2.

In an embodiment of the signal strength changer 26 shown in FIG. 5, a control signal is obtained from the peak value of the reception strength signal supplied from the adder 17 of the microwave radar 52 and the quantity of attenuation of the detection signal is adjusted on the basis of the thus obtained control signal. A variable attenuator 156 included in the signal strength changer 26 performs signal attenuation in proportion to the signal strength of the control signal supplied thereto, and passes the reception signal as it is when no control signal is supplied thereto.

In the signal strength changer 26 of this embodiment, specifically, the reception strength signal from the adder 17 is supplied to a deed zone circuit 151 and the control signal is not outputted when the reception strength signal supplied to the dead zone circuit 151 has a signal level than a predetermined value so that the variable attenuator 156 does not perform the signal attenuation. When the signal level of the reception strength signal supplied to the dead zone circuit 151 is not smaller than the predetermined value, the reception strength signal is supplied to a peak hold circuit 153 after amplified in a amplifier ciccuit 152. The peak hold circuit 153 has a time constant substantially the same as the period of an input pulse signal supplied thereto, that is, the output signal of the amplifier circuit 152, and holds and outputs the peak value of the input pulse signal. An amplifier 154 amplifies the peak value supplied from the peak hold circuit 153 and adds an offset to the amplified value so as to produce the above-mentioned control signal to thereby determine the quantity of attenuation in the variable attenuator 156.

Figure 6A:
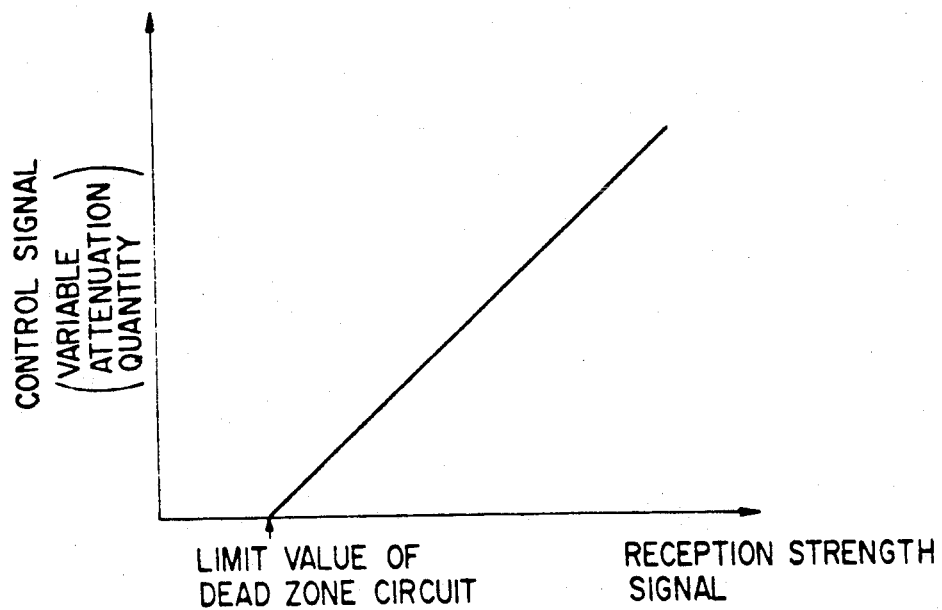
FIGS. 6a and 6b are diagrams showing the operation of FIG. 5.

FIG. 6a shows a characteristic diagram of the signal strength changer 26, in which the relationship between the change of the input reception strength signal and the change of the output control signal, that is, the change of the quantity of attenuation of the variable attenuator 156 is shown. When the reception strength signal has a signal level not smaller than a limit value preset in the dead zone circuit 151, the control signal is made to be proportional to the reception strength signal. In this embodiment, this limit value is set to 0.7 V so that the control signal is outputted when the peak value of the reception strength signal becomes not smaller than 0.7 V.

Figure 6B:
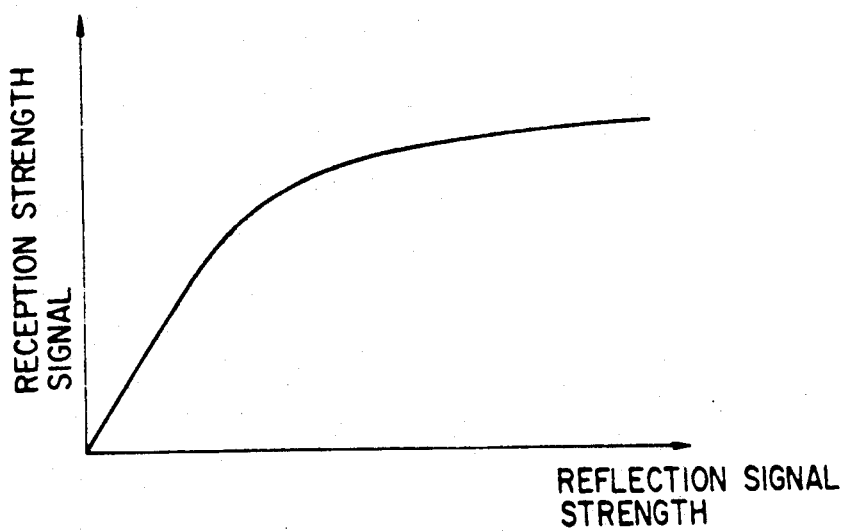

FIG. 6b shows a characteristic diagram of the signal level in the whole measurement apparatus, in which the relationship between the signal strength of the reflection signal received by the reception antenna and the reception strength signal. In the region where the reflection signal strength is small, the signal level of the reception strength signal is low and the signal attenuation by the signal strength changer 26 is not performed. However, as the reflection signal strength becomes large, the signal attenuation by the signal strength changer 26 is performed. Thus, it has been made possible to minimize the change of the reception strength signal even when the reflection signal strength changes by several tens dB.

Figure 7:
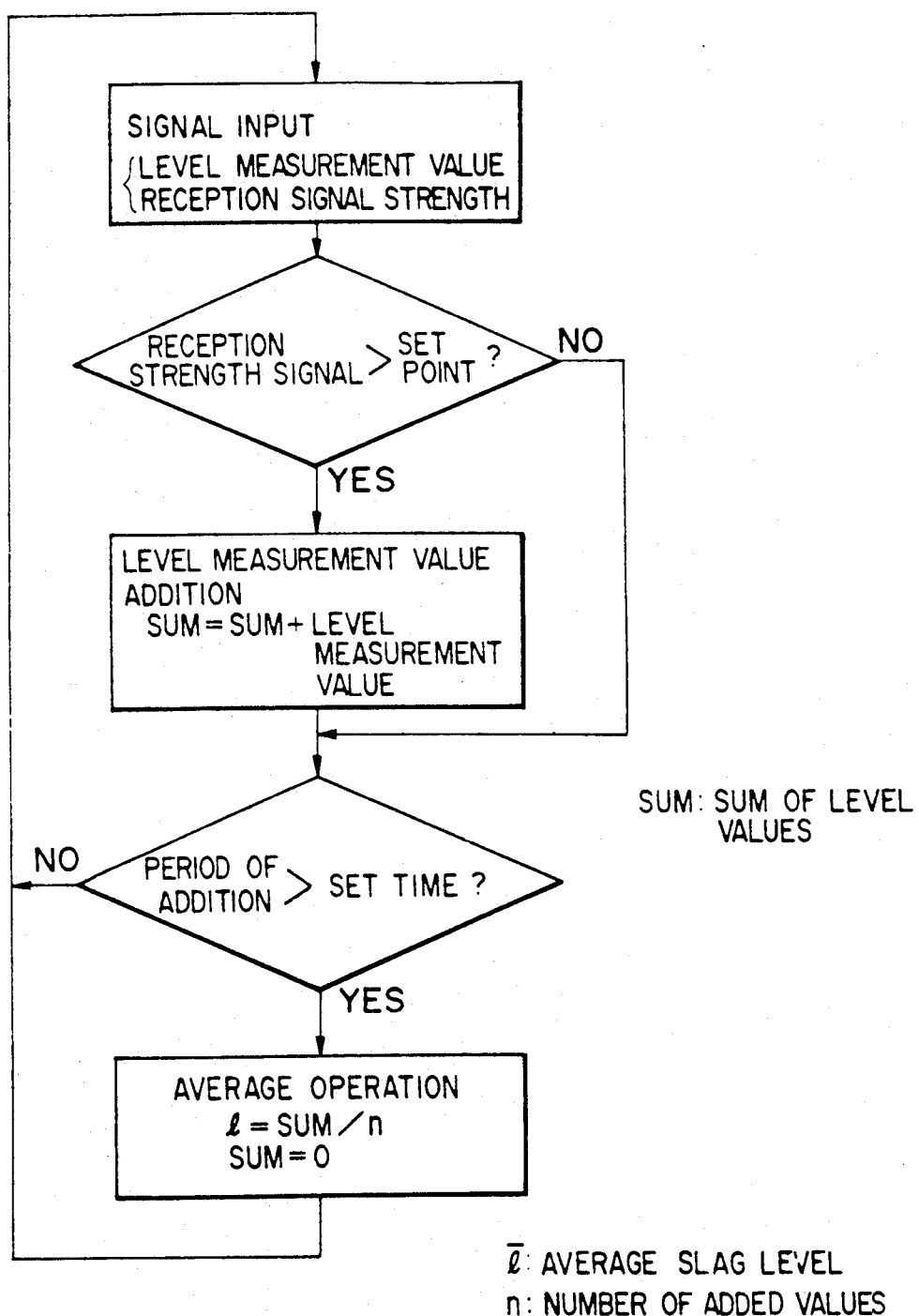
FIG. 7 is a flow chart showing the signal escape in the signal average operator or FIG. 2.

Here, returning to FIG. 2 again, the signal processing in the stage after the distance scaler 18b will be described. As shown in FIG. 7 in which the flow of average operation processing by the average operator 27, the average operator 27 is supplied with a level measurement value from the distance scaler 18b and a reception strength signal from the adder 17. When the peak value of the reception strength signal is larger than a predetermined set point, the average operator 27 adds the level measurement value supplied thereto the sum of the level measurement values when the peak value of the reception strength signal is larger than a predetermined set point, while does not perform the summing when the peak value of the reception strength signal is smaller than the predetermined set point. When the period of the time in which the summing has been performed reaches a set point, the average operator 27 divides the sum of the level measurement values by the number of times of the level measurement value, summing operation to thereby obtain an average slag level. Then, the average operator 27 resets the sum of the level measurement values to zero, prepares for the next averaging operation, and returns to the beginning of the processing to receive the next signal input if the period of the time in which the summing has been performed does not reach the set point, the operation is returned directly too the beginning of the processing to receive the next signal input.

In this embodiment, the average operation processing may be performed by using a personal computer and the resultant average slag level is supplied to the display unit (CRT) 28.

Although the signal strength changer 26 is provided between the reception terminal of the micowave radar 52 and the reception antenna 24 to be inserted into a furnace in this embodiment, the signal strength changer 26 may be provided between the transmission terminal of the microwave radar 52 and the transmission antenna 23.

Since average operator 27 excludes measurement signals due to noises or the like as a result, the microwave radar may be constituted without providing the signal strength changer 26.

Figure 3:
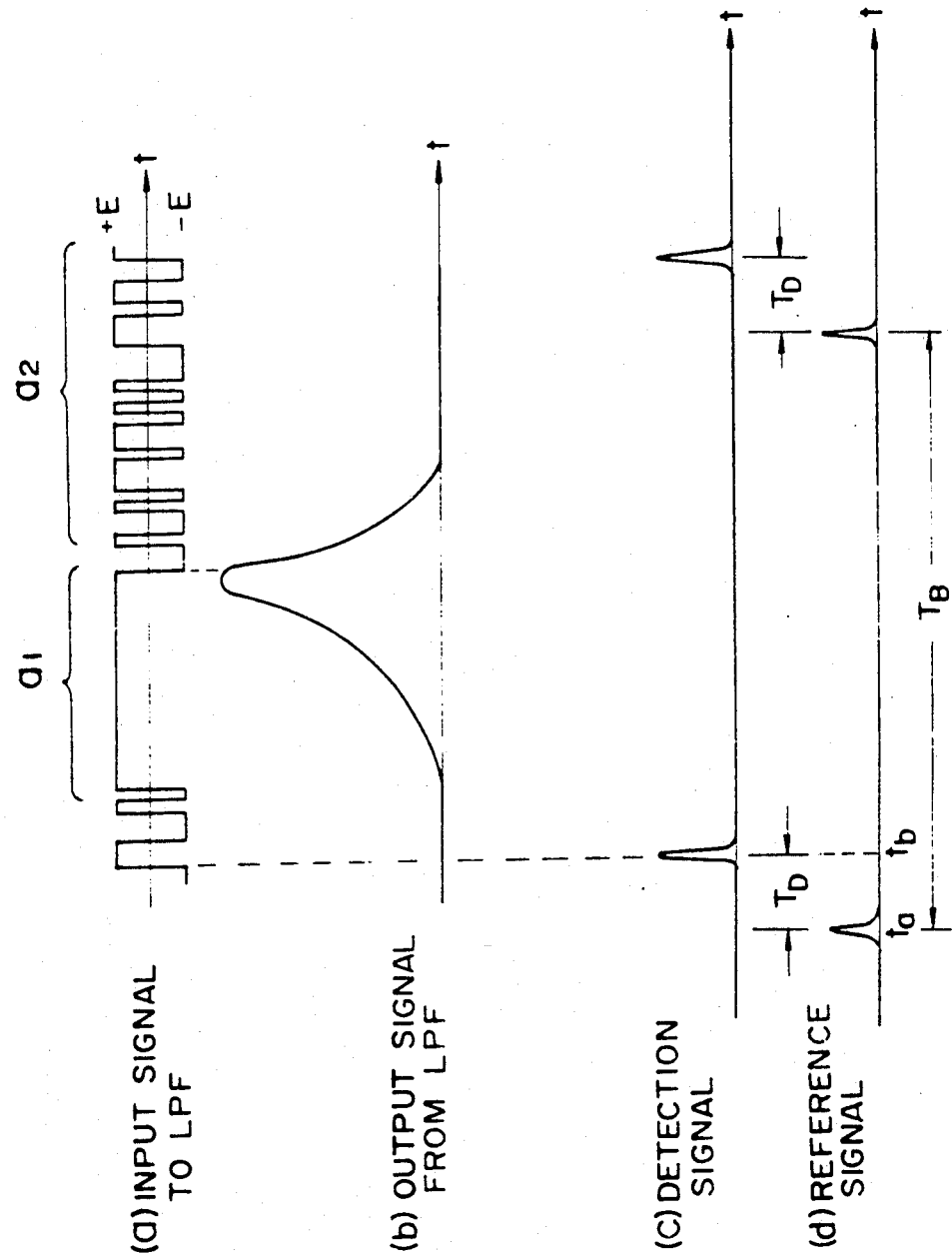
FIG. 3 is a view of waveforms for explaining the operation of the microwave radar depicted in FIG. 1.
Figure 4:
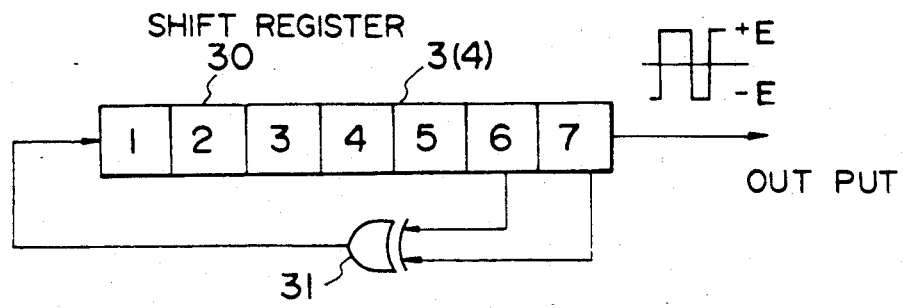
FIG. 4 is a view showing the configuration of an embodiment of the 7-bit M-type signal generator.
Figure 8:
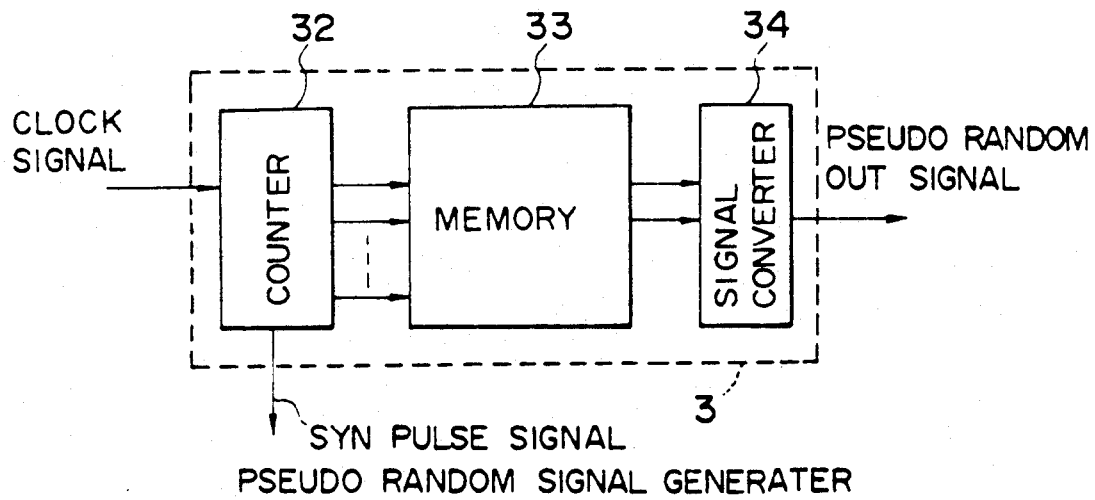
FIG. 8 is a block diagram showing another example of the configuration of the pseudo random signal generator.

Each of the microwave radar pseudo random signal generators 3 and 4 in FIG. 2 may have a configuration as shown in FIG. 3 or may have a configuration as shown in FIG. 8.

The pseudo random signal generator as shown in FIG. 8 is composed of a counter 32, a storage device 33, and a signal convertor 34.

The counter 32 received a clock signal as an input signal, counts the input clock pulses and feeds the count value of clock pulses to the storage device 33. The counter 32 carries out a counting operation from 0 to a count upper-limit value n. When the count reaches to the upper-limit value n, the counter is reset to 0 and then restarts the counting operation. In this embodiment, the upper-limit value is 127, so that the counter 32 repeats the counting operation from 0 to 127 in synchronism the fed clock signal. When the counter is reset to 0, a synchronizing pulse signal is sent out to the outside.

The storage device 33 has a memory for storing data, constituted by an ROM, an RAM, etc. The storage device 33 receives the output count value from the counter 32, reads code date of the pseudo random signal stored in the memory while using the count as an address of the memory and feeds the data to the signal convertor 34.

In this embodiment, the storage device 33 has a capacity for 128 data of the data length of 2 bits designated by addresses of from 0 to 128. The first bit of the respective data in memory represents the code pattern of the pseudo random signal to be stored. Accordingly, the first bit is set to "1" or "0" corresponding to the "1" or "0" of the pseudo random signal. The second bit of the respective data in memory represents a judgement as to whether the data in memory is a code data of the pseudo random signal or not. When the data in memory is a code data, the second bit is set to "1". When the data in memory is not a code data, the second bit is set to "0".

Figures 9, 10, 11:
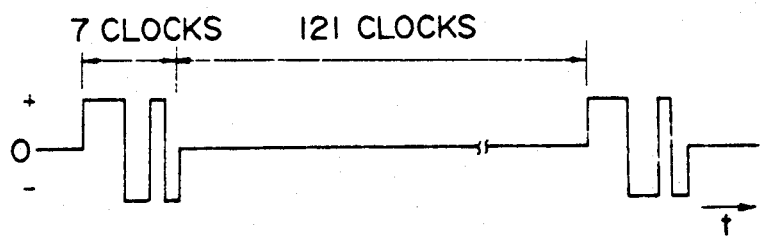
FIG. 9 is a view showing an example of the data in the memory of the storage device depicted in FIG. 8.
FIG. 10 is a view showing the relationship between the input data and output signal of the signal convertor depicted in FIG. 8.
FIG. 11 is a view of an output waveform of the signal convertor.

FIG. 9 shows an example of a table in the case where a Barker code data of code length 7 are stored in the memory of the storage device 33. In this example, 2-bit data represented by "11" and "10" corresponding to the Barker code data are stored in address 0 through 6 of the memory and, at the same time, 2-bit data represented by "00" are stored in the other addresses 7 through 127 of the memory. Because data corresponding to the addresses 0 through 127 are successively read out on the basis of the input signal fed from the counter 32, the data reading operation in the storage device 33 is repeated in a period of 128 clock pulses in synchronism with the clock signal fed to the counter 32.

A table of FIG. 10 shows the relationship between the input data and the output signal in the signal convertor 34 in this embodiment. The signal convertor 34 receives data from the storage device 33, converts the data into a three-value signal and sends out it. That is, when the 2-bit data fed from the storage device 33 is "11" or "10" as representing a code data, the signal convertor 34 generates a positive (+) or negative (−) signal corresponding to the data. When the 2-bit data is "00" or "01", the signal convertor 34 generates a zero signal.

FIG. 11 shows the waveform of the output signal from the signal convertor 34, that is, the waveform of the output signal from the pseudo random signal generator, in the case where data are fed from the storage device 33 having such memory content as shown in FIG. 9. In respect to the output waveform, a positive (+), negative (−) or zero (0) signal is sent out correspondingly to the daata read from the storage device 33. Because the operation of reading data from the storage device 33 is repeated in a period determined by the number of memory addresses in the storage device 33 in synchronism with the clock signal, the output signal from the signal convertor 34 has a waveform formed by repeating 7-clock-pulses' Barker code output signals and 121-clock-pulses' zero signals.

The operation of the microwave radar will be described below in the case where the pseudo random signal generator in FIG. 8 is applied to the microwave radar in FIG. 2. As the operation in FIG. 8 is substantially equal to the operation in FIG. 2, the operation will be described as to the different portion.

In this embodiment, clock signals of 30.002 MHz and 29.998 MHz and a carrier signal frequency of 10 GHz are used. Each of the pseudo random generators 3 and 4 has a structure as shown in FIG. 8. Barker codes having a code length of 7 and a zero signal having a predetermined duration are repeatedly generated in synchronism with the clock signal.

In this embodiment, the multiplier (modulator) 6 performs modulation of a carrier fed from the carrier oscillator 19 through the distributor 13 on the basis of the pseudo random signal fed from the pseudo random signal generator 3. Here, the signal output from the pseudo random signal generator 3 is a three-value signal +, − or 0. When the signal is + or −, phase-modulation is carried out correspondingly to the signal. When the signal is 0, the carrier output is stopped. As a result, the signal transmitted from the radar to the target through the transmission antenna 23 becomes an intermittent signal.

In this embodiment, the receiver 22 used in the microwave radar receives, through the reception antenna 24, the signal reflected on the target, and performs amplification or attenuation on the signal. As indicated by a broken line in FIG. 2, the receiver 22 further receives an output of the pseudo random signal generator 3 as a synchronizing pulse signal so that the receiver 22 outputs the reception signal while temporally changing the signal amplification/attenuation factor in synchronism with the synchronizing pulse signal supplied from the pseudorandom signal generator 3.

Figure 12:
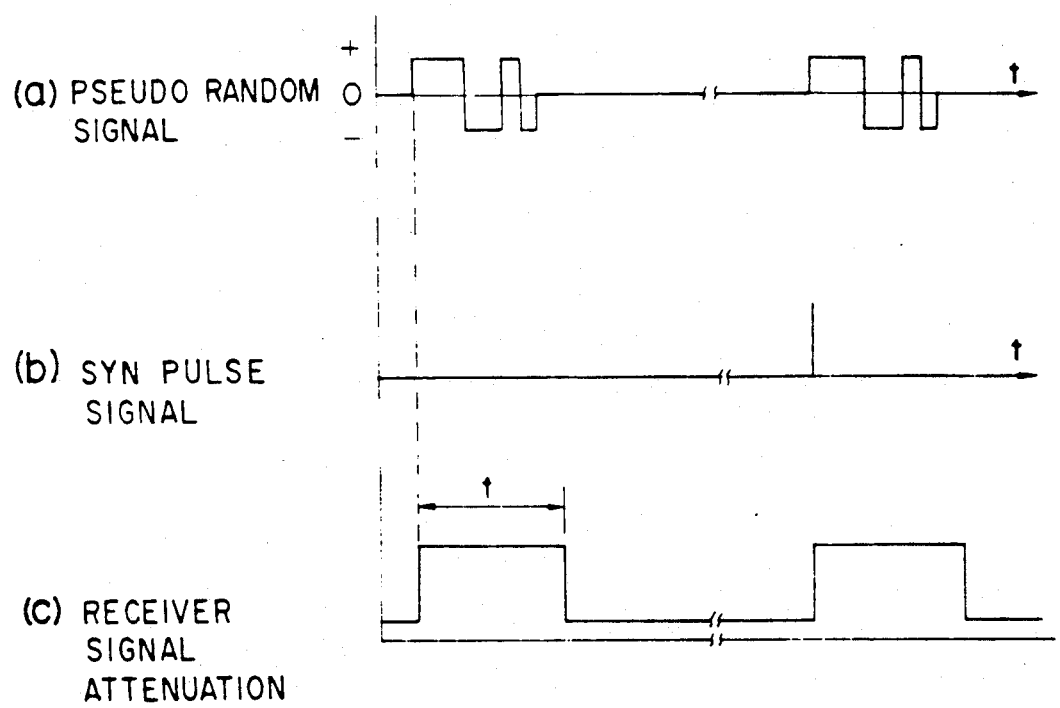
FIG. 12 is a timing chart showing the operation of the receiver in the microwave radar depicted in FIG. 1.

In the timing charts showing the operation of the receiver 22 in FIG. 12, the diagrams (a) and (b) of FIG. 12 respectively show the waveforms of the pseudo random signal and the synchronizing pulse signal as output signals from the pseudo random signal generator 3. The diagram (c) of FIG. 12 shows the time change of the signal amplification factor in the receiver 22. When the receiver 22 receives the synchronizing signal from the pseudo random signal generator 3, the receiver 22 increases the signal attenuation factor for an arbitrary time t after the pulse-inputting instant to restrict the inputting of an unnecessary reflected signal received at the reception antenna 24 in the time to thereby suppress the influence of the unnecessary reflected signal.

As described above, in the case where the signal amplification/an attenuation factor of the receiver 22 is controlled in synchronis with the synchronizing pulse signal supplied from the pseudorandom signal generator 3, the signal strength changer 26 may be omitted depending on the environment of measurement.

In the another embodiment of the microwave radar shown in FIG. 13, the pseudo random signal generator as shown in FIG. 8 is used and the pseudo random signal is directly used as a transmission signal.

Also in this embodiment, the pseudo random signal processing using two pseudo random signals having the same pattern but having slightly different frequencies is employed similary to the aforementioned embodiment in FIG. 2. That is, in this embodiment, clock signals of 30.002 MHz and 29.998 MHz are used. Here, each of the pseudo random signal generators 3 and 4 has a structure as shown in FIG. 8 and performs generation of Barker codes having a code length of 7.

The pseudo random signal from the pseudo random signal generator 3 is fed to the traansmitter 21. The pseudo random signal fed to the transmitter 21 power-amplified and then converted into an electromagnetic wave through the transmission antenna 23. The electromagnetic wave is radiated toward the target. Therefore, the microwave radar in FIG. 9 has a structure in which the carrier oscillator 19, the distributor 13 and the multiplier 6 in FIG. 2 are omitted.

Further, the electromagnetic wave from the transmission antenna 23 is reflected on the target and converted into an electric signal through the reception antenna 24. Then, the electric signal is fed to the receiver 22. Thereafter, the reception signal from the receiver 22 and the pseudo random signal from the pseudo random signal generator 4 are multiplied (mixed) by each other by the multiplier (mixer) 7. The multiplication result is fed to the low-pass filter 11. Accordingly, the distributor 14, the multipliers 8 and 9, the low-pass filter 12, the squarers 15 and 16, the adder 17, the hybrid coupler 20 and the signal strength changer 26 depicted in FIG. 2 are omitted in this embodiment.

The output from the low-pass filter 10 and the output from the low-pass filter 11 are fed to the propagation-time measurer 18a and then processed in the same manner as in the case of FIG. 2 to send out the distance between the transmission and reception antennas 23 and 24 and the target 25 as an output signal from the distance scaler 18a.

In the measuring environment of a narrow space such as the inside space of a furnace in which unnecessary reflected wave will be produced easily, the detection signal based on the necessary reflected wave can be picked up through a time gating circuit by utilizing the advantage that the time for measurement of the distance to the target by the microwave radar is enlarged. Or in other words, the other detection signal based on the unnecessary reflected wave can be removed, so that the level position or the distance can be measured stably.

Although the aforementioned embodiments have shown the case where two antennas are respectively used as a transmission antenna and a reception antenna, it is a matter of course that the present invention is not limited thereto and that the present invention can be applied to the case where a single antenna may be used commonly to transmission and reception. In this case, a technique of separating a transmission signal and a reception signal by using a direction coupler or by using a transmission/reception changeover switch is used in the antenna system.

Although the aforementioned embodiments have shown the case where a microwave of about 10 GHz is used as a carrier, it is a matter of course that the present invention can be applied not only to the case where an electromagnetic wave of an extremely high frequency (EHF), or the like is used as a carrier but to the case where an electromagnetic wave such as light, an acoustic wave, an ultrasonic wave or the like, is used as a carrier.

Further, the velocity of the target can be measured by additionally providing a timer into the aforementioned microwave radar to calculate the change of the measured distance to the target in unit time.

Not only the microwave radar in this embodiment can be used for an in-furnace slag level measurig apparatus, but it can be used for measurment of the position of a target buried in the ground or in the water or for probing in the ground or the like. Furthermore, the microwave radar can be sufficiently used for measurement of the relatively large distance to a general target such as a flying matter, a ship, a car etc. or for measurement of position thereof if clock frequencies for generating two pseudo random signals are set suitably.

What is claimed is:

1. An in-furnace slag level measuring apparatus provided with a microwave radar, said microwave radar comprising:

a first pseudo random signal generation means for outputting a first pseudo random signal;

a second pseudo random signal generation means for outputting a second pseudo random signal having a pattern the same as that of said first pseudo random signal and having a frequency slightly different from that of said first pseudo random signal;

a first multiplier for multiplying said first and second pseudo random signals by each other;

a carrier generation means;

a transmission means for transmitting a transmission signal based on said first pseudo random signal to a slag surface through a transmission antenna inserted into a furnace;

a reception means for receiving a signal reflected on said slag surface through a reception antenna inserted into said furnace to thereby obtain a detection signal;

a second multiplier for multiplying said reception signal by said second pseudo signal to thereby output a carrier;

a detector means for detecting said carrier outputted from said second multiplier to thereby output a reception strength signal; and a time difference measurement means for measuring a time difference between a time series pattern of said reception strength signal outputted from said detector means and a time series patterns of a multiplication value outputted from said first multiplier to thereby outputs a level measurement value; and a signal strength changer inserted between said transmission means and said transmission antenna or between said reception antenna and said reception means for adjusting the signal level of said transmission signal or said reception signal in accordance with a degree of said reception strength signal outputted from said detector means and for outputting the thus adjusted signal.

2. An in-furnace slag level measuring apparatus according to claim 1, in which said microwave radar comprises an average operator for averaging said level measurement value in place of said signal strength changer.

3. An in-furnace slag level measuring apparatus according to claim 1, further comprising an average operation means for averaging the level measurement value signal.

4. An in-furnace slag level measuring apparatus according to claim 3, in which said average operation means has a function for performing an average operation while neglecting said level measurement value whenever the value of said reception strength signal is lower than a set point.

5. An in-furnace slag level measuring apparatus according to claim 1, in which each of said first and second pseudo random signal generation means includes; a counter for counting clock signal pulses to thereby output a count value; a storage device from which stored data are read out while using the count value supplied from said counter as an address; and a signal convertor for converting the read-out stored data into a three-value signal as an output thereof; and in which said reception means is capable of changing signal reception sensitivity with the passage of time in synchronism with the period of the pseudo random signal.

6. An in-furnace slag level measuring apparatus according to claim 1,
in which said microwave radar is not provided with said signal strength changer;
in which each of said first and second pseudo random signal generation means includes: a counter for counting clock signal pulses to thereby output a count value; a storage device from which stored data are read out while using the count value supplied from said counter as an address; and a signal convertor for converting the read-out stored data into a three-value signal as an output thereof; and
in which said reception means is capable of changing signal reception sensitivity with the passage of time in synchronism with the period of the pseudo random signal.

7. An in-furnace slag level measuring apparatus according to claim 1, in which said detector means includes:

a first distributor for taking out a part of the output of said carrier generation means;

a hybrid coupler supplied with an output of said first distributor and for converting said output into an in-phase component, namely, an I signal and a quadrature component, namely, a Q signal, said I and Q signals having phases perpendicularly intersecting each other;

a second distributor for distributing the output of said second multiplier into two signals, namely, an R1 signal and an R2 signal;

a third multiplier for multiplying said the I signal outputted from said hybrid coupler by said R1 signal outputted from said second distributor; and a fourth multiplier for multiplying said Q signal outputted from said hybrid coupler by said R2 signal outputted from said second distributor.

8. An in-furnace slag level measuring apparatus according to claim 1, in which said time difference measurement means includes:

a first low-pass filter supplied with the output of said first multiplier to thereby perform a band limitation;

second and third low-pass filters supplied with the output signals of said third and fourth multipliers respectively to thereby perform band limitations independently of each other;

first and second squarers supplied with the output signals of said second and third low-pass filters respectively to thereby perform squaring operations independently of each other;

an adder for adding the respective output signals of said first and second squarers to each other; and a time measurer for measuring a time between a point of time when the output signal of said first low-pass filter takes its maximum value and a point of time when the output signal of said adder takes its maximum value.

9. An in-furnace slag level measuring apparatus according to claim 1, in which said microwave radar further comprises carrier generation means for generating a carrier which is modulated with said first pseudo random signal so as to be said transmission signal.

* * * * *